United States Patent [19]

Nozawa

[11] 4,453,100

[45] Jun. 5, 1984

[54] FLAT COIL ELEMENT FOR AN ELECTRIC MOTOR AND METHOD OF MANUFACTURING THE SAME

[75] Inventor: Yoshikuni Nozawa, Suwa, Japan

[73] Assignee: Entac Co., Ltd., Suwa, Japan

[21] Appl. No.: 326,513

[22] Filed: Dec. 2, 1981

[30] Foreign Application Priority Data

Dec. 5, 1980 [JP] Japan ............................ 55-171582
Apr. 24, 1981 [JP] Japan ............................ 56-62208
May 25, 1981 [JP] Japan ............................ 56-78996

[51] Int. Cl.³ ............................................. H02K 3/04
[52] U.S. Cl. .................................... 310/203; 310/268; 336/225
[58] Field of Search ........ 310/268, 180, 184, 198–208, 310/195, 42, 179, 264; 29/596, 598; 336/225

[56] References Cited

U.S. PATENT DOCUMENTS

| 503,449 | 8/1893 | Blood | 310/208 |
|---|---|---|---|
| 2,138,292 | 11/1938 | Casale | 310/208 |
| 3,950,664 | 4/1976 | Andreica | 310/203 |
| 4,321,496 | 3/1982 | Hickey | 310/268 |

FOREIGN PATENT DOCUMENTS

| 49-121902 | 11/1974 | Japan | 310/198 |
|---|---|---|---|
| 52-38102 | 3/1975 | Japan | 310/198 |
| 51-122703 | 10/1976 | Japan | 310/198 |
| 51-132402 | 11/1976 | Japan | 310/198 |
| 53-163602 | 12/1978 | Japan | 310/198 |
| 56-115151 | 10/1981 | Japan | 310/208 |
| 1032345 | 6/1966 | United Kingdom | 310/198 |
| 1344144 | 1/1974 | United Kingdom | 310/198 |
| 2059300A | 4/1981 | United Kingdom | 310/198 |

*Primary Examiner*—R. Skudy
*Attorney, Agent, or Firm*—Frishauf, Holtz, Goodman & Woodward

[57] ABSTRACT

A coil element of the invention is formed by a flat ring-shaped original winding. Reference lines which pass the central point form angles $\alpha$ and $\beta$. Points at intersections of the periphery of the flat ring-shaped original winding and the reference lines are thus determined. Bending lines which extend from the points and which form an angle $\phi$ with the reference lines are determined. The flat ring-shaped original winding is divided into first and second coil segments. The first coil segment is bent along the bending lines and pressed on part of the second coil segment to manufacture the coil element.

15 Claims, 12 Drawing Figures

FLAT COIL ELEMENT FOR AN ELECTRIC MOTOR AND METHOD OF MANUFACTURING THE SAME

BACKGROUND OF THE INVENTION

The present invention relates to a flat coil element for an electric motor and to a method of manufacturing the same and, more particularly, to a flat coil element for an electric motor and a method for manufacturing the same in which a rotor of a coreless motor and a flat field winding of a electric motor are formed.

Electric motors generally comprise a stator and a rotor as is well known, and the rotor moves relative to the stator in predetermined positional relation. The torque of these electric motors is generated by an electromagnetic force between the stator and the rotor. Electric motors are classified into electric motors in which vertical magnetic flux with respect to the rotating shaft is utilized, and electric motors in which horizontal magnetic flux with respect to the rotating shaft is utilized. In both electric motors, the electromagnetic force is produced in accordance with the direction of the magnetic flux and the current direction flowing through the coil mounted to the rotor so that the rotor rotates. The electromagnetic force is generated in each part of the coil upon rotation of the rotor. The coil has active and passive parts, wherein the active part provides a large force in a tangential direction and contributes to the rotating efficiency, and the passive part provides a large force in a radial direction and does not contribute to the rotating efficiency. Various proposals have been made to improve the efficiency by improving the relation between the active part and the passive part. For example, in a printed motor coil, passive parts at the inner and outer peripheries are reduced in accordance with an involute winding and the active part is increased. Further, an armature coil in which coil elements which are formed by bending in a polygonal shape, are shifted from each other in the circumferential direction, has been proposed. In the first case, the diameter of the outer periphery of the armature coil is necessarily large. Further, the polygonal coil elements have a sunbstantially large passive part, reducing the operating efficiency. This armature coil is not suitable for 2 or 4 pole electric motors. In general, the coil element of the armayture coil preferably has a linear shape. U.S. Pat. application Ser. No. 139,275 filed on Apr. 14, 1980, now U.S. Pat. No. 4,401,907 and Patent Application No. 2,509,300 filed on Apr. 16, 1980 proopose a case in which the rotating efficiency is increased by a coil element which has an arcuate conductive band. This coil element is fabricated by alternately bending a original winding which it tightly wound inside and outside so that a wave-shaped coil element is prepared. However, this bending operation is not easily accomplished.

SUMMARY OF THE INVENTION

It is an object of the present invention to provide a flat coil element for an electric motor and a method of manufacturing the same, in which an armature coil is made compact and achieves high performance.

In order to achieve the above and other objects of the present invention, there is provided a flat coil element for an electric motor, comprising at least one first coil segment which comprises an arcuate flat portion and which has two substantially linear ends of substantially equal length; and at least one second coil segment which comprises an arcuate flat portion, having common ends with said first coil segment, which has an overlapping part in close contact with part of said first coil segment, and which defines a closed loop band together with said first coil segment by unfoldng at said common ends as bending lines, said band being obtained by winding a single wire concentrically and helically.

According to the present invention, there is provided an armature unit for an electric motor including a pair of flat coil elements which are combined at an electrical phase difference of 180°, each flat coil element comprising at least two first coil segments which comprise arcuate flat portions and each of which has two substantially linear ends of substantially equal length; and at least two second coil segments comprising arcuate flat portions, each of which has common ends with said first coil segments, and which define a closed loop band together with said first coil segments by unfolding at said common ends as bending lines, said band being obtained by winding a single wire concentrically and helically, and said first coil segments of said flat coil elements being mutually tight.

Further, according to the present invention, there is provided a method of manufacturing a flat coil element for an electric motor comprising the steps of: forming an original winding by concentrically and helically winding a single wire; determining reference lines each of which connects an arbitrary point on a central axis of said original winding with a predetermined division point on the periphery of said original winding, said reference lines alternately forming angles A and B with respect to the central axis; dividing said original winding by bending lines into at least two first coil segments and at least two second coil segments forming an angle $\phi$ between said bending lines and the reference line, said bending lines extending from the division points into a division area which is defiined on said original winding by a pair of reference lines; and overlapping the parts of said first coil segments to the parts of said second coil segments by bending said first coil segments along the bending lines.

DETAILED DESCRIPTION OF THE PREFERRED EMBODIMENTS

Figure 1:
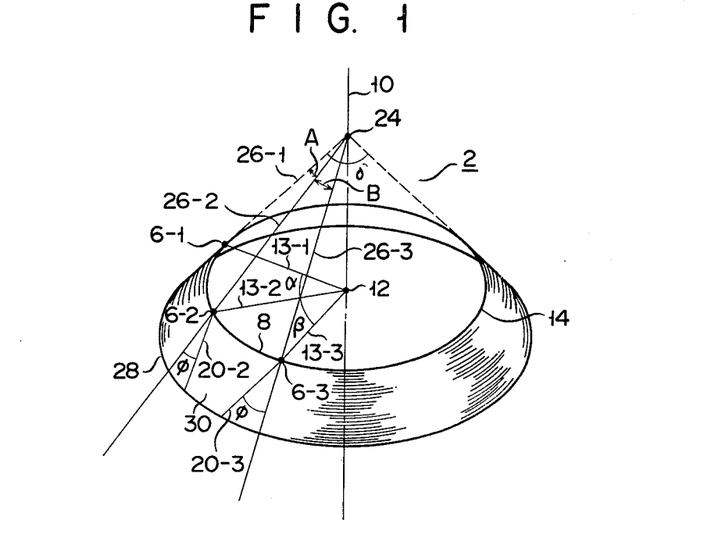
FIG. 1 is a perspective view illustrating an original winding of a truncated conical form for fabricating a coil element according to the present invention.
Figure 2:
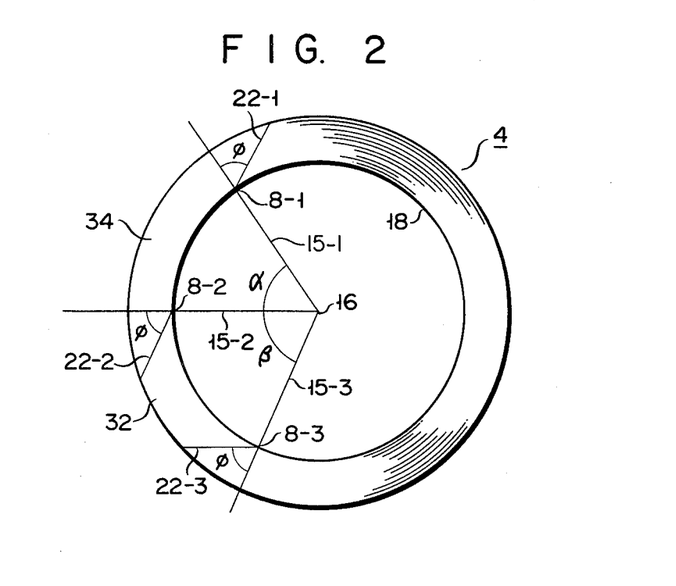
FIG. 2 is a plan view of an original winding of flat ring shape for fabricating a coil element according to the present invention.
Figure 3:
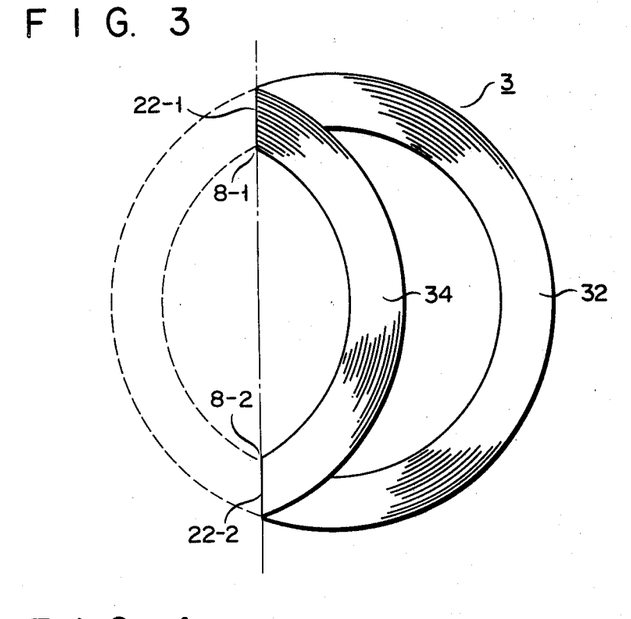
FIG. 3 is a plan view of a coil element for preparing an armature for a 2-pole motor according to one embodiment of the present invention.
Figure 4:
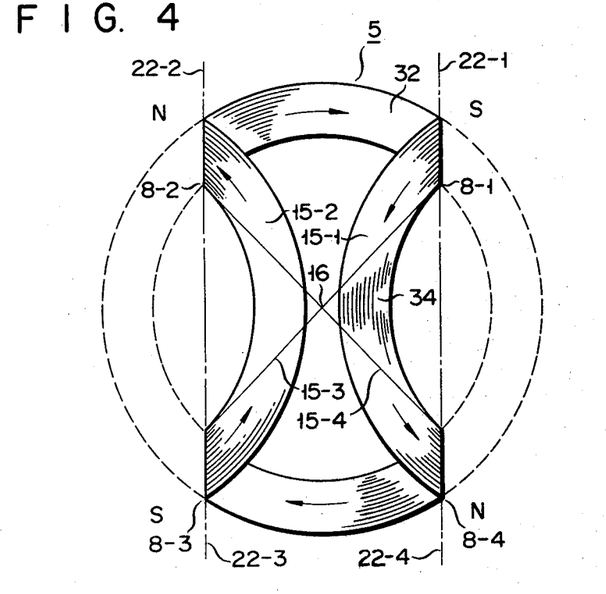
FIG. 4 is a plan view of a coil element for preparing an armature of a 4-pole motor according to a modification of the present invention.
Figure 5:
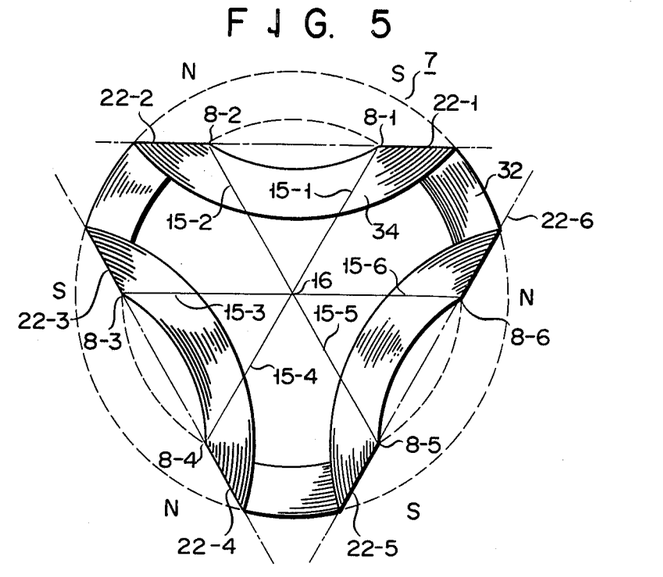
FIG. 5 is a plan view of a coil element for preparing an armature of a 6-pole motor according to another modification of the present invention.
Figure 6:
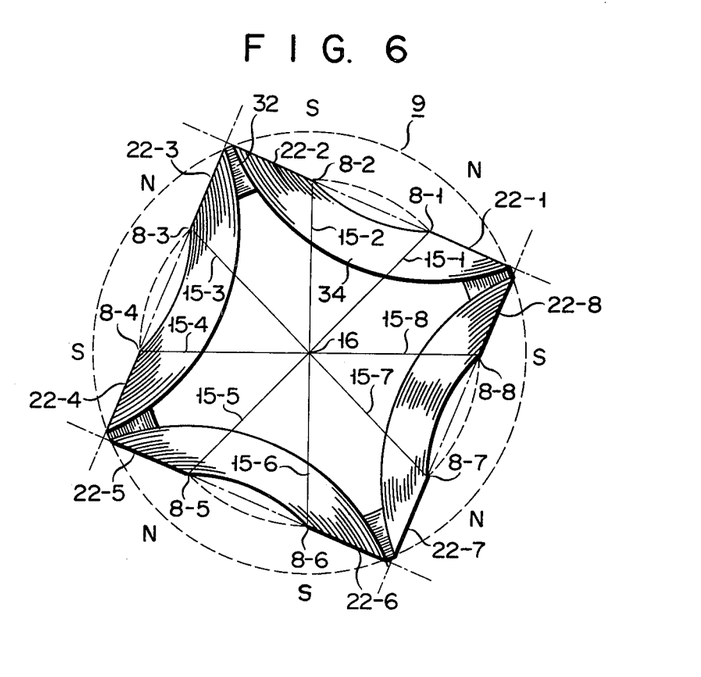
FIG. 6 is a plan view of a coil element for preparing an armature of an 8-pole motor according to still another modification of the present invention.

Various coil elements 5, 7 and 9 (FIGS. 4–7) are formed by a truncated conical original winding 2 as shown in FIG. 1, or by a flat ring-shaped original winding 4 as shown in FIG. 2 coil element 3 of FIG. 3 will be described further below. The truncated conical original winding 2 is manufactured by aligning and winding a conductive wire around a jig of conical shape and by mutually adhering the turns. The flat ring-shaped original winding 4 is manufactured by concentrically aligning and winding a conductive wire around a flat jig having a projected circular region, in the same manner as in the truncated conical original winding 2. In the truncated conical and flat ring-shaped original windings 2 and 4, dividing points 6-1 to 6-2n and 8-1 to 8-2n are determined where n is an integer of at least 2. The dividing points 6-1 to 6-1n and 8-1 to 8-2n number 2n, which corresponds to the number of poles 2n, of an electric motor. In the truncated conical original winding 2 as shown in FIG. 1, the dividing points 6-1 to 6-2n are represented by intersections between radii 13-1 to 13-2n and a circular periphery 14, the radii 13-1 to 13-2n alternately forming angles $\alpha$ and $\beta$ about the central point 12 in such a manner that the perigon 360° around a central point 12 of a truncating plane 8 through which the central axis 10 is extended is equal to $n(\alpha+\beta)$. In the flat annular original winding 4, as shown in FIG. 2, the dividing points 8-1 to 8-2n are represented by intersections between radii 15-1 to 15-2n and a circular periphery 18, the radii 15-1 to 15-2n alternately forming angles $\alpha$ and $\beta$ about the central point 16 in such a manner that the perigon 360° around a central point 16 is equal to $n(\alpha+\beta)$. Two kinds of bending lines 20-1 to 20-2n and 22-1 to 22-2n which number 2n and which pass through the dividing points 6-1 to 6-2n and 8-1 to 8-2n, respectively, are determined in a manner to be described below. In the truncated conical original winding 2, bending lines 20-1 to 20-2n of equal length which exted over the bent width of the truncated conical original winding 2 form a predetermined angle $\phi$ relative to generatrices 26-1 to 6-2n which pass the dividing points 6-1 to 6-2n and an imaginary apex 24 of the truncated conical block form. These bending lines 20-1 to 20-2n have the same angle $\phi$ with respect to the generatrices 26-1 to 26-2n and a pair of bending lines defines a conductive coil segment of the original winding to be described later. In other words, a pair of adjacent bending lines among the bending lines 20-1 to 20-2n form the angle $\phi$ in different directions relative to the corresponding generatrices among the generatrices 26-1 to 26-2n. In the same manner, in the flat ring-shaped original winding 4, bending lines 22-1 to 22-2n form the same angle $\phi$ with the radii 15-1 to 15-2n so that a pair of bending lines defines a conductive coil segment of the original winding. In other words, a pair of adjacent bending lines among the bending lines 22-1 to 22-2n form the angle $\phi$ in different directions relative to the corresponding radii among the radii 15-1 to 15-2n. The region on the truncated conical original winding 2 is divided into conductive coil segments 28 and 30, and the region on the flat ring shaped original winding 4 is divided into coil segments and 32 and 34 by bending lines 20-1 to 20-2n and 22-1 to 22-2n, respectively. The area of the conductive coil segments 28 and 34 is larger than that of the conductive coil segments 30 and 32. The conductive segments 28 and 34 correspond to the active portion of the respective coil elements 3, 5, 7 and 9 and the conductive coil segments 30 and 32 correspond to the passive portion of the respective coil segments 3, 5, 7 and 9. In the embodiment, the conductive coil segments 28 and 34 of large area are subjected to preliminary bending along the bending lines and further bending is performed. As shown in FIGS. 4 to 6, the large conductive coil segments 28 and 34 are bent over the small conductive coil segments 30 and 32 and pressed to prepare the flat coil elements 3, 5, 7 and 9. The conductive coil segments 28 and 34 are formed alternately along the periphery of the original coil windings 2 and 4. All the conductive coil segments 28 and 34 need not be folded on the same side. They may be folded on opposite sides. As may be apparent, the small conductive coil segments 30 and 32 may be bent, instead of the large conductive coil segments 28 and 34.

When one of the coil elements 5, 7 and 9 as shown in FIGS. 4 to 6, respectively, is prepared from the truncated conical original winding 2, the relation among the angle $\phi$ of the bending line and the reference line, the angle A between the reference lines, an imaginary apex angle $\delta$ and the number of bending lines 2n is given by equation (1):

$$\phi = (\pi - A)/2 - \pi/2n[1 - \sin(\delta/2)] \qquad (1)$$

The reason why equation (1) is obtained will be described with reference to FIGS. 1 and 7.

Figure 7:
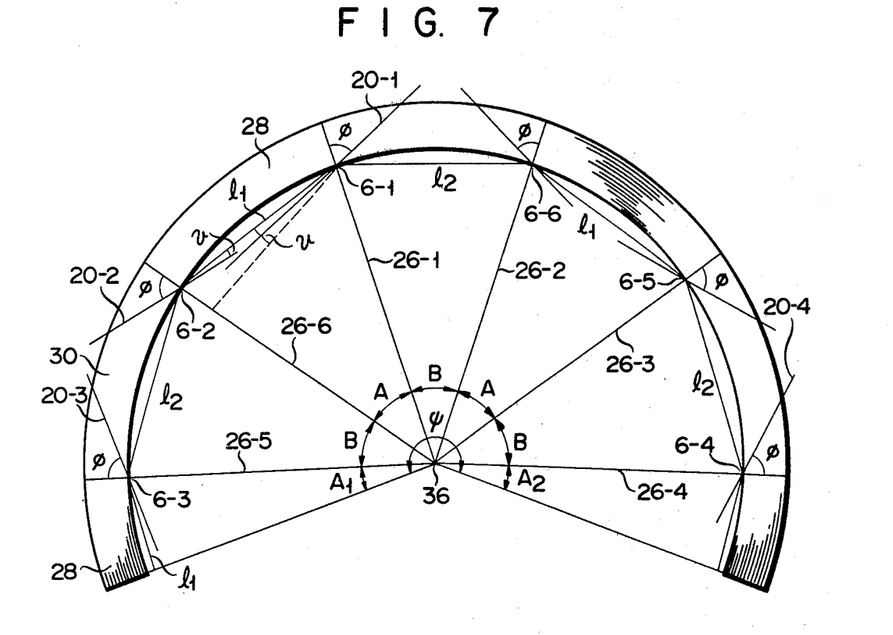
FIG. 7 is a developed plan view of the original winding of FIG. 1.

The truncated conical original winding 2 as shown in FIG. 1 is developed as an arcuate band as shown in FIG. 7. In this case, an interior angle $\psi$ is defined by equation (2).

$$\psi = 2\pi \sin(\delta/2) \qquad (2)$$

In the developed view as described above, the interior angle $\psi$ is alternately divided into the angles A and B by the generatrices 26-1 to 26-6. Since the inner periphery of the truncating plane is divided into the same portions alternately by the angle $\alpha$ and $\beta$, the pheriphery circumscribes a polygon formed by chords 11 and 12 between adjacent dividing points 6-1 to 6-2n. The chord 11 corresponds to the angle $\alpha$ and the chord 12 corresponds to the angle $\beta$. Therefore, the inner periphery of the arcuate band shown in FIG. 7 also circumscribes an open polygon formed by the chords 11 and 12. As a result, the interor angle $\psi$ of a deployment center 36 is divided into the angles A corresponding to the chords 11 and the angles B corresponding to the chords 12. The angles A and the angles B are alternately repeated. Thus, equation (3) is given.

$$n(A+B) = \psi \qquad (3)$$

In FIG. 7, angles A1 and A2 have relation $A1+A2 = A$.

Assume that the conductive coil segment 28 is folded along the bending lines 20-1 and 20-2 which pass the dividing points 6-1 and 6-2. In the bending line 20-1, the chord 11 is displaced to a position of axial symmetry with respect to the bending line 20-1, which in indicated by the broken line. That is, if an angle which is formed between the bending line 20-1 and the chord 11 is defined as v, the chord 11 is displaced through an angle 2v toward the deployment center 36. However, when the conductive coil segment 28 is bent along the bending lines 20-2 and 20-4, the position of the bending point 6-2 of the chord 12 does not change even through bending is performed. Only the bent line is traced. Therefore, the sum of the bending interior angles which are formed corresponding to the sum of the chords 11 and 12 is reudced by an angle $2n \times 22v$ because bending is performed along the bending lines 20-1 to 20-2n. As apparent from the above description, the pair of bending lines 20-1 and 20-2, and 20-3 and 20-4, and so on, are regarded as the pairs for folding the conductive coil segment 28.

When a 2n polygon is formed by reducing the sum of the bending interior angles by the angle 4nv, that is, when the chords 11 and 12 close, one of the coil elements 3, 5, 7 and 9 is formed. Therefore, when the difference between the sum of the bending interior angles and the sum of the interior angles of the 2n polygon is 4nv, the polygon is closed. An interior angle of the bending lines is defined by equation (4):

$$M = \left( \frac{\pi - A}{2} + \frac{\pi - B}{2} \right) 2n = (2\pi - A - B)n \quad (4)$$

The sume of the interior angles of the 2n polygon is defined by equation (5).

$$N = (2n - 2)\pi \quad (5)$$
$$= 2\pi(n - 1)$$

Therefore, $$4nv = (2\pi - A - B)n - (n - 1)2\pi \quad (6)$$
$$= 2\pi - (A + B)n$$

Equation (3) is substituted in equation (6) and equation (2) is further substituted in the obtained result, so that equation (7) is established.

$$v = \frac{1}{4n}(2\pi - \psi) \quad (7)$$

$$v = \frac{\pi}{2n} 1 - \sin\left(\frac{\delta}{2}\right)$$

The relation between the angle v and the bending angle $\phi$ is shown in FIG. 7 and is defined in equation (8).

$$\phi = \frac{\pi - A}{2} - v \quad (8)$$

Therefore $$\phi = \frac{\pi - A}{2} - \frac{\pi}{2n}\left(1 - \sin\left(\frac{\delta}{2}\right)\right) \quad (1)$$

Equation (1) is established for the truncated conical original winding 2. Further, if the condition $\delta = \pi$ is given, equation (1) is also applicable to the flat ring-shaped original winding 4 shown in FIG. 2. Equation (9) is thus obtained.

$$\phi = \frac{\pi - A}{2} \quad (9)$$

where $A = \alpha$.

Equation (1) as described above may be modified. For example, the bending angle $\phi$ is expressed by the angles $\alpha$ and $\beta$. Further, the bending side of the conductive coil segment of the coil element and the radii 13-1 to 13-2n form angles $\theta$ so that the fabricated coil element is checked.

Examples of the coil elements 5, 7 and 9 which are used for motors which have various number of poles, manufactured according to the method of the present invention, are shown in FIGS. 4 to 6. These coil elements 5, 7 and 9 are manufactured from the flat ring-shaped original winding 4 as shown in FIG. 2. Coil elements which are manufactured from the truncated conical original winding 2 as shown in FIG. 1 may have substantially the same shape as the coil elements manufactured from the flat ring-shaped original winding 4. However, in the coil elements manufactured from the flat ring-shaped original winding 4, the bending sides of the respective conductive coil segments 32 and 34 extend along the chords 11 and 12, while in the coil elements manufactured from the truncated conical original winding 2, the bending sides of the respective conductive coil segments 28 and 30 respectively form an angle with respect to the chords 11 and 12. In the coil element 5 as shown in FIG. 4, the condition n=2 is given. Therefore, this coil element 5 is used for a 4-pole motor (2n=4). Poles N and S of the magnetic field are indicated outside the periphery of the coil element 5 for explanatory convenience. When the coil element 5 is located at part of an armature coil and a current is supplied to the coil element 5, the current flows in a manner as indicated by the arrow in FIG. 4. Therefore, a magnetic force which acts as a rotational force and which is formed by the magnetic flux generated from the poles S and N, is applied to the conductive coil segment 34 which is the active portion of the coil. On the other hand, a magnetic force is also applied to the conductive coil segment 32 which is the passive portion of the coil, in the same manner as in the conductive coil segment 34. The latter magnetic force is generated in the radial direction passing through the central point 16, so that this magnetic force does not contribute to the rotational movement. However, the conductive coil segment 32 which is the passive portion of the coil element 5 is of arcuate shape, and comprises a plurality of portions of point symmetry with respect to the central point 16. Further, these conductive coil segments are substantially the same size so that the activated magnetic forces are balanced. Therefore, the magnetic force which is generated in the conductive coil segment 32 which is the passive portion of the coil element 5, does not prevent the rotational movement. In the coil element 5, the conductive coil segment 34 which is the arcuate active portion of the coil element 5 is regarded as the region which generates the rotational force. The conductive coil segment 34 is of band shape and comprises tightened and aligned turns of wire, so that the current component per unit area is sufficiently increased. Further, since the area is sufficiently increased, the performance of the armature coil is greatly increased. The same advantages are accomplished in the coil element for a 6-pole motor, and the coil element for an 8-pole motor, respectively shown in FIGS. 5 and 6, besides the coil element for the 4-pole motor as shown in FIG. 4.

Figure 8:
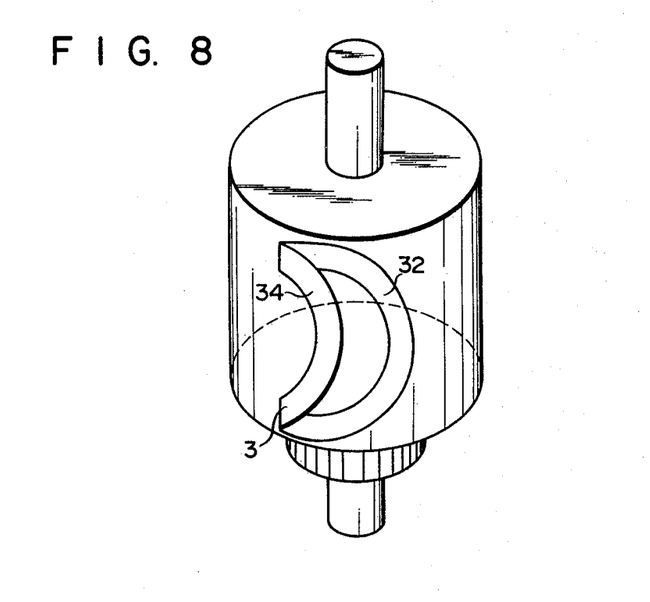
FIG. 8 is a perspective view of a rotor of a cup motor including the orignial winding of FIG. 2.

In the above embodiment, the coil elements wherein n is at least 2 are described. When the condition n=1 is given, that is, when the coil element 3 for a 2-pole motor is to be considered, the method for manufacturing a coil element for an electric motor according to the present invention may be substantially applied to the coil element 3. In the coil element 3 for the 2-pole motor, the truncated conical original winding 2 cannot be used. The coil element 3 manufactured from the flat ring-shaped original winding 4 of FIG. 2 can only be used. As shown in FIG. 3, two arbitrary dividing points 8-1 and 8-2 are taken on the inner periphery, and the bending lines 22-1 and 22-2 are determined by conecting the bending points 8-1 and 8-2 of the flat ring-shaped original winding 4. The flat ring-shaped original winding 4 is divided into the conductive coil segment 34 which is the active portion of the flat ring-shaped original winding and the conductive coil segment 32 which is the passive portion of the flat ring-shaped original winding 4. Thereafter, the conductive coil segment 34 is bent over along the bending lines 22-1 and 22-2 to prepare the coil element 3. By combining these coil elements 3, an armature coil for a flat electric motor and an armature for a cup motor of FIG. 8 are manufactured. Referring to FIG. 8, only one coil element is indicated for explanatory purpose. However, in practice, a plurality of coil elements as needed are aligned on the surface of a cylinder. In the armature coil of the cup motor, as shown in FIG. 3, preliminary bending is performed to extend the conductive coil segments 34 and 32 on the outer surface of a cylindrical body in such a manner that the bending sides of the coil element 3 are substantially parallel to the axis of the cylindrical body. A number of the conductive coil segments 34 and 32 are shifted from each other so that the armature coil is thus manufactured. In this case, the overlapping parts of the coil element may be bent over to the upper surface or the lower surface of the cylindrical body.

In the practical design and manufacture of the coil element, the original winding may not be a complete truncated conical body or a complete flat ring-shaped assembly. The shape of the original winding may be of elliptical shape, or truncated ellipsoidal shape, and may include linear portions.

Figure 9:
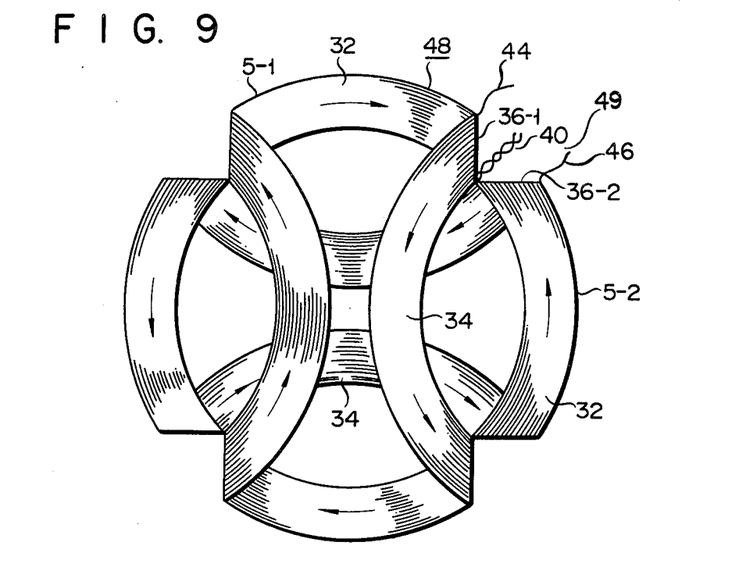
FIG. 9 is a plan view of an armature coil unit according to another embodiment of the present invention.
Figure 10:
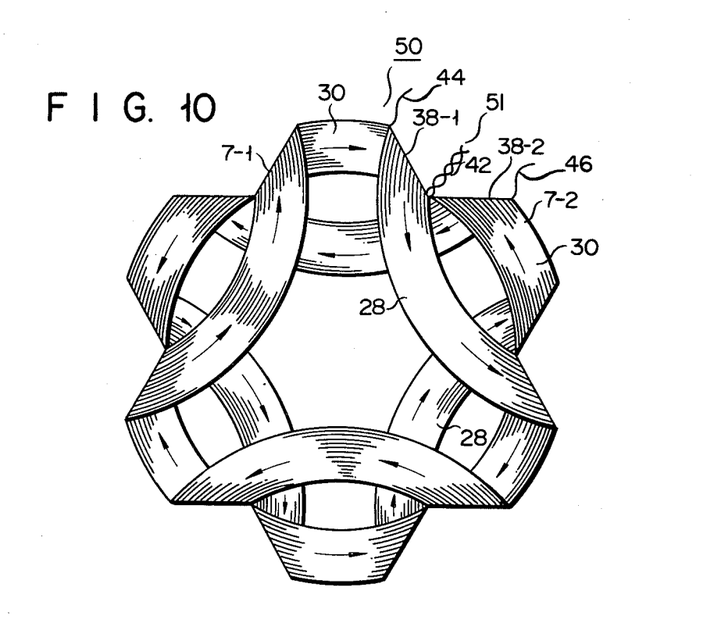
FIG. 10 is a plan view of an armature coil unit according to still another embodiment of the present invention.

Armature coil units 48 and 50 which are formed by pairs of coil elements and which are the basic units for manufacturing armature coils will be described with reference to FIGS. 9 and 10. Referring to FIG. 9, the armature coil unit 48 is used for a 4-pole motor. The armature coil unit 50 is used for a 6-pole motor as shown in FIG. 10. A pair of coil elements of the same type and size, and which have a phase difference of 180° are combined together. The armature coil unit 48 of FIG. 9 comprises a pair of coil elements of FIG. 4. The conductive coil segments 34 which are the active portions of the coil elements are opposed to each other and pressed together. In the same manner, an armature coil unit 50 of FIG. 10 comprises a pair of coil elements of FIG. 5. When the armature coil units 48 and 50 as shown in FIGS. 9 and 10 are formed, a pair of coil elements are arranged so that the coil elements have an electrical phase difference of 180°. In addition to this, the following items must be noted.

A pair of coil elements 5-1 and 5-2 or 7-1 and 7-2 for the armature coil unit 48 or 50 have the same shape and size. The angles $\alpha$ and $\beta$ are formed by every other pair of adjacent radii which are formed by connecting the adjacent dividing points among the dividing points 6-1 to 6-2n and 8-1 to 8-2n and the central points 12 and 16, respectively. The relation $\alpha \geq \beta$ must be established. However, if $\alpha < \beta$, the pair of coil elements 5-1 and 5-2 or 7-1 and 7-2 have the phase difference of 180° and bending end portions 36-1 and 36-2 or 38-1 and 38-2 mutually overlap. In this manner, the thickness of the bending end portions 36-1 and 36-2 or 38-1 and 38-2 is made four times the thickness of the band. If $\alpha \geq \beta$ the bending end portions 36-1 and 36-2 or 38-1 and 38-2 do not overlap. Therefore, the armature coil unit 48 is formed at a thickness twice the thickness of the band as a whole. Specifically, referring to FIG. 9, the conductive coil segment 32 of one coil element 5-1 and the conductive coil segment 34 of the other coil element 5-2 are aligned on the same plane, thus providing the armature coil unit 48 of a thickness twice the thickness of the band. In the same manner, referring to FIG. 10, the conductive coil segment 28 of one coil element 7-1 and the conductive coil segment 30 of the other coil element 7-2 are aligned on the same plane, thus, providing the armature coil unit 50 of a thickness twice the thickness of the band.

When the pair of coil elements 5-1 and 5-2 or 7-1 and 7-2 are respectively wound in the same direction, that is, in the clockwise or counterclockwise direction, and when the pair of coil elements 5-1 and 5-2 or 7-1 and 7-2 overlap, a pair of initial ends 40 and 42 of the pair of coil elements 5-1 and 5-2 or 7-1 and 7-2 are respectively connected to each other. A current is applied to a pair of terminal ends 44 and 46 of the pair of coil elements 5-1 and 5-2 or 7-1 and 7-2. Therefore, the current distribution as indicated by the arrows in FIG. 9 or 10 is accomplished. On the other hand, when the pair of coil elements 5-1 and 5-2 or 7-1 and 7-2 are respectively wound in the opposite directions and they overlap, one of the initial ends 40 and 42 is connected to one of the terminal ends 44 and 46, and a current is applied to the other initial end and terminal end, accomplishing the current distribution as indicated by the arrows in FIG. 9 or 10. However, when an erroneous connection is performed, the current distribution, as described above, cannot be obtained since the current vectors of the respective coil elements 5-1 and 5-2 or 7-1 and 7-2 cancel each other. Therefore, rotational force may not be generated. The connections are preferably performed in a space 49 or 51 which is formed between the bending end portions 36-1 and 36-2 or 38-1 and 38-2.

In the armature coil units 48 and 50 manufactured in the above-mentioned manner, a plurality of coil elements are arranged equiangularly around the axis to form a flat armature or a flat coil. As apparent from the above description, the thickness of the manufactured flat armature or flat coil may be made 2m (m=1, 2, 3 . . . ) the thickness of the armature coil unit, accomplishing the flat shape. Furthermore, the overlapping end portions are well aligned so that the surface is very smooth, reducing the air gap. The armature coil unit is first prepared by combining the pair of coil elements and then the armature coil is manufactured, simplifying the assembly process and increasing the manufacturing efficiency. Further, when the assembly according to the method of the present invention is used as the armature coil, an unnecessary air gap is eliminated and the well-balanced structure is accomplished. Therefore, operations such as an adjustment for balancing are omitted. Further, vibration of a motor incorporating, the present armature coil may be eliminated. The armature coil of this type is highly resistant to centrifugal force so that a motor which adopts this armature coil, is suitable for intermittent and high speed operations.

Figure 11:
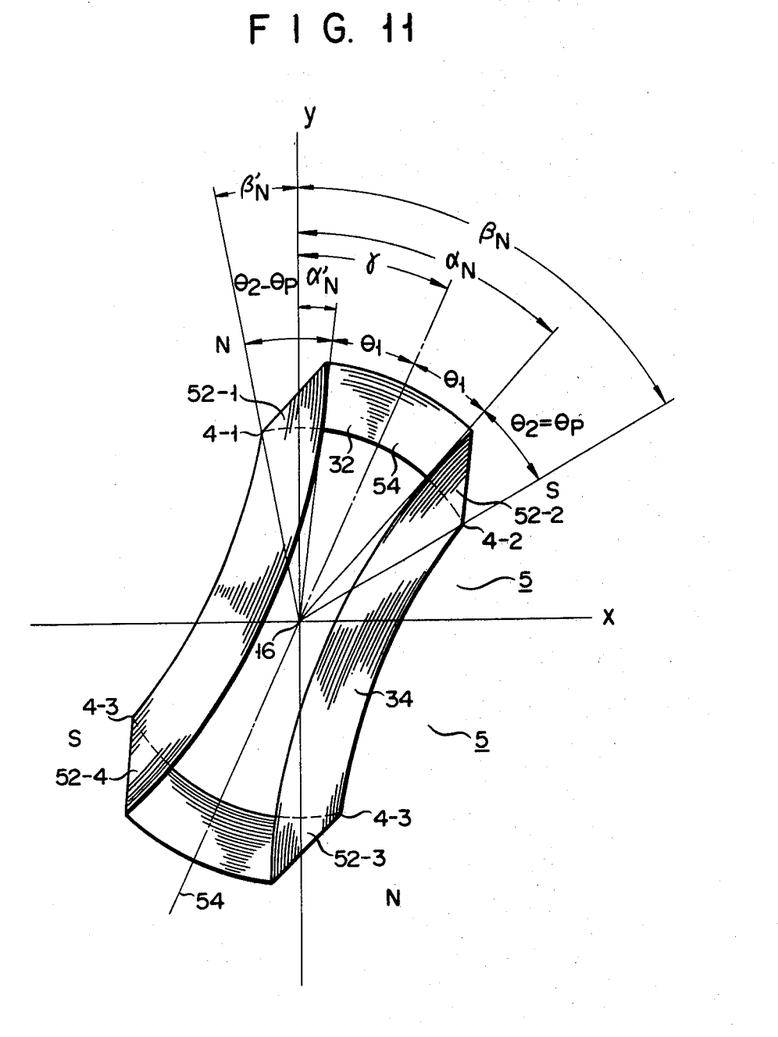
FIG. 11 is a plan view of a coil element according to still aother embodiment of the present invention.

When a plurality of coil elements, that is, coil elements which number m, are aligned around the central axis to form a flat armature which has poles numbering 2n, instead of forming the armature coil unit as described above, the respective coil elements must satisfy the following requirements. A coil element which has a pole number 2n has conductive band overlapping parts 52-1 to 52-2n. A coil element which has 4 poles, for example, has the four conductive band overlapping parts 52-1 to 52-4 as shown in FIG. 11. When an armature is constituted by coil elements 5 numbering m, the total number of the conductive band overlapping parts is 2n×m. The conductive band overlapping parts 52-1 to 52-2n are aligned around the center of the armature, so that an area for a pitch angle $\theta P$ whose maximum value is defined by equation (10) is occupied.

$$\theta P = \frac{360°}{2nm} = \frac{180°}{nm} \quad (10)$$

This pitch angle for a 4-pole armature is 90°/m. It is to be noted that the fact that the conductive band overlapping part occupies the pitch angle $\theta P$ means that an angle $\theta 2$ around the central point 16 takes the pitch angle $\theta P$ as the maximum angle. The angle $\theta 2$ is defined as the angle formed by a line which passes the central point 16 and the bending reference point 4-1, and a tangent of the conductive band overlapping part 52-1 which passes the central point. A half angle $\theta 1$ of an angle $2\theta 1$ which is formed by tangents of the conductive band overlapping parts 52-1 and 52-2 which pass the central point 16, that is, $2\theta 1$ which is formed by lines which connect the central point 16 and both side ends of a region 54 of the conductive coil segment 32 which are adjacent the conductive band overlapping parts 52-1 and 52-2, is set to a value which is obtained by multiplying the pitch angle P by an integer. When the half angle $\theta 1$ is set in this manner, other conductive band overlapping parts of the coil element 5 do not overlap in a band area between the adjacent conductive band overlapping parts 52-1 and 52-2. Therefore, the coil elements 5 which number m constitute a sufficiently flat armature.

The conditions in which the conductive band overlapping parts 52-1 to 52-4 do not overlap when n=2 will be described. The coil element 5 for a 4-pole motor, that is, when n=2, is symmetrical about the axis 54, so that the coil elements 5 which number m are equiangularly disposed withing the angle 180°when these coil elements are combined in order to form an armature. Therefore, the pitch angle $\theta m$ of each coil element 5 is defined as $\theta m = 180°/m$. This pitch angle $\theta m$ is expressed as $\theta m = n\theta p = 2\theta p$ according to equation (2). One of the coil elements 5 which numbers m is located on the Y axis, that is, the axis 54 which coincides with the Y axis is defined as a first coil element. When the nth coil element is located in the location indicated in the figure, the deviation angle $\alpha$ is defined by the following equation:

$$\alpha = (N-1)\, \theta m = (N-1)n\theta p.$$

Therefore, angles $\alpha N$, $\beta N$, $\alpha' N$ and $\beta' N$ are defined as follows:

$$\alpha N = \theta 1 + (N-1)n\theta P = \theta 1 + 2(N-1)\theta P$$

$$\beta N = \theta 1 + \theta P + (N-1)n\theta P = \theta 1 + (2N-1)\theta P$$

$$\alpha' N = (N-1)\, n\theta P - \theta 1 = 2(N-1)\theta P - \theta 1$$

$$\beta' N = (N-1)\, n\theta P - \theta 1 - \theta P = (2N-3)\theta P - \theta 1$$

If the conditions m=5, $\theta 1 = 1.2\theta P$ are given, the angles $\alpha N$, $\beta N$, $\alpha' N$ and $\beta' N$ for the first to fifth coil elements 5 are calculated as in Table I below:

TABLE I

| No | $\alpha$ | $\beta$ | $\alpha'$ | $\beta'$ |
|---|---|---|---|---|
| 1 | 1.2 × $\theta P$ | 2.2 × $\theta P$ | −1.2 × $\theta P$ | −0.2 × $\theta P$ |
| 2 | 3.2 | 4.2 | 1.8 | 0.8 |
| 3 | 5.2 | 6.2 | 2.8 | 1.8 |
| 4 | 7.2 | 8.2 | 4.8 | 3.8 |
| 5 | 9.2 | 10.2 | 6.8 | 5.8 |

As apparent from Table I, the angle $\beta$ of the first coil element is larger than the angle $\beta'$ of the third coil element, so that the conductive band overlapping parts 52-1 and 52-2 overlap and the overlapping area comprises four layers. In the same manner, the overlapping phenomena occur between the second and fourth coil elements and between the third and fifth coil elements. Further, since the angle $\alpha'$ of the third coil element is smaller than the angle $\alpha$ of the second coil element, a gap is formed between the conductive band overlapping parts, that is, between the third and fourth coil elements and between the fourth and fifth coil elements.

In order to eliminate these gaps between the respective coil elements, the angle $\alpha$ of a coil element must be the same as the angle $\alpha'$ of the coil element which is adjacent to this coil element. Further, in order to eliminate the overlapping between the conductive band overlapping parts, the condition $\alpha 1 = \alpha' 2$ must be satisfied and the following equation is established.

$$\theta 1 = 2(2-1)\theta p - \theta 1$$

Therefore, the relation $\theta 1 = \theta P$ is established. In the same manner, since the angles $\alpha$ and $\alpha'$ of the adjacent coil elements are the same, $\theta 1 = \theta P$ is also established. That is, when $\theta 1$ is set to a value which is obtained by multiplying the pitch angle $\theta P$ by an integer, the air gaps are eliminated and the conductive band overlapping portions are aligned tightly.

Table II shows the relations among the angles $\alpha N$, $\beta N$, $\alpha' N$ and $\alpha' N$ when the conditions m=5 and $\theta 1 = \theta P$ are given. As apparent from Table II, the conductive band overlapping portions do not overlap and are aligned tightly.

TABLE II

| No | $\alpha$ | $\beta$ | $\alpha'$ | $\beta'$ |
|---|---|---|---|---|
| 1 | 1 × $\theta P$ | 2 × $\theta P$ | −1 × $\theta P$ | 0 × $\theta P$ |
| 2 | 3 | 4 | 2 | 1 |
| 3 | 5 | 6 | 3 | 2 |
| 4 | 7 | 8 | 5 | 4 |
| 5 | 9 | 10 | 7 | 6 |

Figure 12:
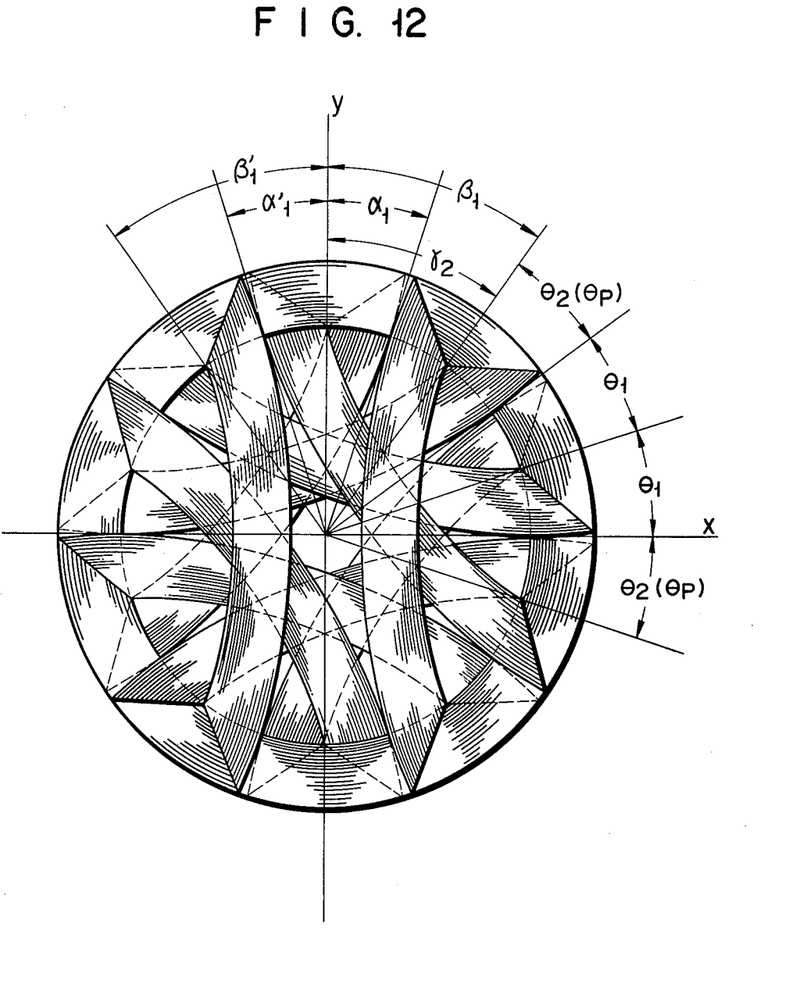
FIG. 12 is a plan view of an armature fabricated from the coil elements of FIG. 11.

The armature coil unit is shown in FIG. 12 for reference when m=5 and $\theta 1 = \theta P$. The cross-hatched parts indicate the conductive band overlapping portions.

In summary, according to the present invention, overlapping of the overlapping parts of each conductive band is prevented so that the coil elements are aligned flat, resulting in high coil density of the armature and increasing efficiency of the coil. In the practical design and manufacture, errors in size and shape naturally occur. In order to avoid the overlapping, the pitch angle θP is set to be slightly smaller than 180°/mn which is the reference. Further, the pitch angle θP may be set to be slightly smaller than 180°/mn with consideration of the number of conductors required.

What is claimed is:

1. A flat coil element for an electric motor of at least two poles, comprising:
    at least one first conductive coil segment in the form of an arcuate flat band part having two substantially linear first ends of substantially equal length, wherein said first ends define first bending lines; and
    at least one second conductive coil segment in the form of an arcuate flat band part and having two substantially linear second ends of substantially equal length, wherein said second ends define second bending lines each coincident with a different one of said first bending lines of said first conductive coil segment, said second segment has overlapping parts in close contact with opposed parts of said first coil segment, said second conductive coil segment being electrically connected to said first conductive coil segment at the coincident first and second bending lines to define a closed loop folded band together with said first conductive coil segment.

2. A flat coil element according to claim 1, wherein said flat coil element is for a 2-pole motor, and comprises one said first conductive coil segment and one said second conductive coil segment which has said second ends connected with the coincident first ends of said first conductive coil segment.

3. A flat coil element for an electric motor comprising:
    at least one first conductive coil segment in the form of an arcuate flat band part having two substantially linear first ends of substantially equal length, wherein said first ends define first bending lines; and
    at least one second conductive coil segment in the form of an arcuate flat band part and having two substantially linear second ends of substantially equal length, wherein said second ends define second bending lines each coincident with a different one of said first bending lines of said first conductive coil segment and said second conductive segment has overlapping parts in close contact with opposed parts of said first coil segment, said second conductive coil segment being electrically connected to said first conductive coil segment at the coincident first and second bending lines to define a closed loop folded band together with said first conductive coil segment;
    wherein said flat coil element is for at least a 4-pole motor and comprises two said first conductive coil segments and two said second conductive coil seqments, and each of said second conductive coil segments has a second end connected to a first end of one of said two first conductive coil seqments and the other second end connected to a first end of the other one of said two first conductive coil segments.

4. A flat coil element according to claim 3, wherein said flat coil element is for a 6-pole motor, and comprises three said first conductive coil segments and three said second conductive coil segments, each of said second conductive coil segments having its second ends connected to first ends of two different ones of said first conductive coil segments.

5. A flat coil element according to claim 3, wherein said flat coil element is for an 8-pole motor, and comprises four said first conductive coil segments and four said second conductive coil segments, each of said second conductive coil segments having its second ends connected to first ends of two different ones of said first conductive coil segments.

6. A flat coil element according to claim 1, wherein said closed loop folded band is of substantially truncated conical block form when unfolded.

7. A flat coil element according to claim 1, wherein said closed loop folded band is of substantially flat ring shape when unfolded.

8. A flat coil element according to claim 1, wherein an overlapping part between said first conductive coil segment and said second conductive coil segment is disposed within an area of said flat coil element which is defined by two lines forming an angle θP expressed by:

$$\theta P = 360°/2nm$$

where 2n is the number of poles and m is the number of flat coil elements to be combined.

9. An armature unit for an electric motor including a pair of flat coil elements which are combined at an electrical phase difference of 180°, each flat coil element comprising at least two first conductive coil segments in the form of arcuate flat band parts each having two substantially linear first ends of substantially equal length; and
    at least two second conductive coil segments in the form of arcuate flat band parts each having two substantially linear second ends of substantially equal width each of which is coincident with a different one of the first ends of said first conductive coil segments, wherein said second conductive coil segments define a closed loop folded band together with said first conductive coil segments, and
    means for electrically connecting said first conductive coil segments of one of said flat coil elements with said first conductive coil segments of the other one of said flat coil elements.

10. An armature unit for an electric motor including a pair of flat coil elements which are combined at an electrical phase difference of 180°, each flat coil element comprising at least two first conductive coil segments in the form of arcuate flat band parts each having two substantially linear first ends of substantially equal length; and
    at least two second conductive coil segments in the form of arcuate flat band parts each having two substantially linear second ends of substantially equal length each of which is coincident with a different one of the first ends of said first conductive coil segments, wherein said second conductive coil segments define a closed loop folded band together with said first conductive coil segments, and
    means for electrically connecting said first conductive coil segments of one of said flat coil elements with said first conductive coil segments of the other one of said flat coil elements;

wherein each said flat coil element is for at least a 4-pole motor, and comprises two said first conductive coil segments and two said second conductive coil segments, and each of said second conductive coil segments has a second end connected to a first end of one of said two first conductive coil segments and the other second end connected to a first end of the other one of said two first conductive coil segments.

11. An armature unit according to claim 10, wherein each said flat coil element is for a 6-pole motor, and comprises three said first conductive coil segments and three said second conductive coil segments, each of said second conductive coil segments having its second ends connected to first ends of two different ones of said first conductive coil segments.

12. An armature unit according to claim 10, wherein each said flat coil element is for an 8-pole motor, and comprises four said first conductive coil segments and four said second conductive coil segments, each of said second conductive coil segments having its second ends connected to first ends of two different ones of said first conductive coil segments.

13. An armature unit according to claim 10, wherein each said closed loop folded band is of substantially truncated conical block form when unfolded.

14. An armature unit according to claim 10, wherein each said closed loop folded band is of substantially flat ring shape when unfolded.

15. An armature unit according to claim 10, including wire ends which extend from each of said pair of flat coil elements, and said wire ends are mutually connected at one of a number of spaces which are formed in overlapping parts of said flat coil elements.

* * * * *

UNITED STATES PATENT AND TRADEMARK OFFICE
CERTIFICATE OF CORRECTION

PATENT NO. : 4,453,100
DATED : June 5, 1984
INVENTOR(S) : Yoshikuni NOZAWA

It is certified that error appears in the above-identified patent and that said Letters Patent is hereby corrected as shown below:

Column 3, line 14, "coil" should read --Coil--;

Column 3, line 47, "exted" should read --extend--;

Column 5, line 12, "reudced" should read --reduced--;

Column 5, line 12, "2n x 22v" should read --2n x 2v--;

Column 12, line 38, "width" should read --length--.

Signed and Sealed this

Fifteenth Day of January 1985

[SEAL]

Attest:

Attesting Officer

GERALD J. MOSSINGHOFF
Commissioner of Patents and Trademarks